UNITED STATES PATENT OFFICE.

ALFRED CARLES DE CAUDEMBERG, OF NICE, FRANCE.

WATERPROOF BUILDING MATERIAL.

1,220,401.

Specification of Letters Patent. Patented Mar. 27, 1917.

No Drawing. Application filed November 29, 1913, Serial No. 803,708. Renewed August 10, 1916. Serial No. 114,287.

*To all whom it may concern:*

Be it known that I, ALFRED CARLES DE CAUDEMBERG, a citizen of the Republic of France, residing at 20 Boulevard Raimbaldi, Nice, France, doctor of medicine, have invented a Waterproof Building Material; and I do hereby declare the following to be a full, clear, and exact description of the invention, such as will enable others skilled in the art to which it appertains to make and use the same.

This invention relates to a new chemical product or composition and the process of manufacturing the same, said product being especially designed and adapted for making elastic, waterproof and vibration-proof materials for building and constructional purposes.

It is based upon the following chemical phenomenon:

If ordinary cement be treated with boiling gas-tar to which an addition of india-rubber has been previously made, as hereinafter described, a composition is obtained in which the properties of tar and cement are greatly modified.

In effect, gas-tar being mixed with absorbent inert matters is capable of producing compositions which are solid in the cold state but these compositions have no resistance to heat and as soon as the temperature reaches 40 degrees C., the tar again passes to the liquid state and the elements of the mixture become separated. On the contrary, the product obtained through the action of cement on tar to which india-rubber has been added acquires the property of resisting temperatures exceeding 100 degrees C., without suffering any alteration whatever and the elements constituting the combination never become separated even at higher temperatures.

Further, although this product is possessed of great cohesive powers it remains essentially elastic and comparatively plastic, while cement in its ordinary uses forms in oxidizing aluminates and silicates of lime which substances are hard and brittle in the extreme, more especially as regards the latter.

The various analyses which have been made of cement treated by boiling tar to which india-rubber was previously added have shown that the reactions which take place are as follows: It is known that cement is a composition of lime and clay (silicate of alumina) dehydrated; the decomposition of silicate of alumina by water, that is by hydration (water acting as acid) gives on the one hand aluminate of lime the formation of which is the cause of the phenomenon of the setting of cement, and on the other hand silicate of lime, which reaction is far slower and which is the cause of the hardening of the cement.

By substituting for water, as the oxidizing agent, boiling gas-tar (to which india-rubber has been previously added), the decomposition of the silicate of alumina is also obtained but the silica which is freed instead of combining with lime in order to form silicate of lime, combines with the tar for which it has a far greater affinity and gives rise to a new substance the formula of which it has not yet been possible to distinctly determine but which possesses properties which are very different from those of the two components especially as regards the manner in which said new substance acts at high temperatures.

Free alumina combines with lime as in the case of the decomposition by means of water and forms aluminate of lime which causes coagulation or setting of the composition.

India-rubber which it would seem plays the part of a catalytic agent remains incorporated in the mass to which it imparts a very considerable elastic capacity and develops therein cohesive properties of exceptional energy.

Consequently, it is easily understood that as the formation of silicate of lime is excluded from the reaction process or only produced in a very small quantity, the matter preserves a plastic consistency instead of becoming hard and brittle. This series of actions and reactions constitutes the fundamental character of the product obtained, which latter is a veritably new chemical product or composition and distinguished from similar compositions which are in fact but ill-defined and more or less perfect mixtures.

The best practical process of manufacture is as follows:

Gas-tar is distilled by the use of ordinary known apparatus, such as a cylindrical retort, double coil, and the like, for the separation of the products, and the process is carried on up to 180 degrees C.

From the oils that are recovered benzol or raw benzin (the density of which is about 0.930) is extracted and after being mixed with carbon bisulfid is used for dissolving india-rubber.

The residue of the distillation is preserved for use in the process of manufacture.

The dissolving of the india-rubber is obtained by the maceration in the cold state of the rubber divided up into small fragments in a mixture of equal parts of benzol and carbon bisulfid.

The proportions are as follows:

*Formula No. 1.*

Rubber ---------------------- 0 kgs. 500
Benzol ---------------------- 5 " 000
Carbon bisulfid -------------- 5 " 000

Raw rubber and preferably soft and sticky gums should be used and the addition to the benzol as solvent of an equal quantity of carbon bisulfid is essential to insure the action of the latter substance on the rubber.

The dissolution is carried out in a closed vessel provided with a stirring device which accelerates the dissolution by separating the gummy mass formed by the matter swollen through the absorption of the solvents; it takes 7 to 8 days before completion; a good dissolution should appear under the form of a thick and whitish paste which is homogeneous and contains no foreign matters; there should not be any lumps or solid particles; in order to make sure, the stuff should be sieved and should there be any lumps or solid particles, the residue should be allowed to dissolve again in an additional quantity of solvent and incorporated in the mass after complete dissolution.

The density of the solution according to the above formula shall be 0.980.

The proportion of rubber may vary from 4% to 10% in order to impart to the final product the proportions that are required in practice for the use to which it is destined.

On the other hand, the residue of the distillation of the tar is introduced into a vat provided with a heating arrangement; said residue should be brought to a density of 1.220 at a temperature of 55 degrees C.

In order to obtain said density, it is necessary to increase the consistency either by concentration through the boiling process or through the addition of thickening matters of similar chemical nature, such as pitch, rosin, or other hydrocarbids soluble in tar, the proportion to be added being determined in each case by the density to be obtained.

In this state and at the temperature of 55 degrees C. the residue is poured slowly in a thin small stream into the cold rubber solution.

The proportion of the above mixture is as follows:

*Formula No. 2.*

Residue of the distillation of tar brought to a density of 1.220 at a temperature of 55 degrees C ------------------ 37 kgs. 000
Rubber solution according to Formula No. 1 --------------- 12 " 500

In this operation great care should be taken to mix up the two liquids very thoroughly and in proper proportion; the temperature of the mass rises rapidly and this causes the evaporation of part of the rubber solvents; consequently, it is essential to avoid the proximity of any ignited substance and to provide ventilation so as to dispel the inflammable vapors; industrially the operation is carried out in a closed vessel provided with suitable means for mixing the liquids and sucking the vapors which are led into a cooling plant for the partial recovery of the solvents.

The cooled mixture, density 1.165 at 40° C., appears in the form of a sticky and homogeneous paste having the same consistence as mastic. This cooled mixture will be hereinafter referred to as the mastic.

It is to this mastic liquefied by heat that cement is added to obtain the final result. The latter operation owing to the extremely adhesive and cohesive properties of the mixture of the said mastic and cement requires a powerful mechanical plant and a mixing apparatus of special design exercising its effects in the two planes normal in relation to one another.

In practice, in order to facilitate the operation and to insure the good execution thereof, the following procedure is adopted:

The product resulting from the combination of the mastic and cement is intended to have inert matters such as sand, gravel and the like, added thereto in order to constitute construction materials: instead of placing the cement into direct contact with the liquefied mastic, sand and gravel are first added and after mixing the whole together at a temperature of 100° to 120° C., cement is added.

This process shows several advantages: It enables the mineral matters to become better impregnated with the mastic, the latter remaining fluid before the addition of cement; this thus obviates the cooling which the mixture would suffer if a large quantity of sand and gravel were introduced; finally, as the mastic is spread all around the solid grains, the action of the cement is more rapid, more efficient and the manipulation offers less resistance.

The above preparations are determined according to the following formula:

*Formula No. 3.*

Liquefied mastic (Formula No. 2) ........................ 10 kgs. 000
Calcareous sand (dry) .......... 38 " 000
Tarred or dried porphyry gravel ........................ 24 " 000
Stir mixture thoroughly and add Portland cement ........ 25 " 000

Cement is added by small quantities successively and in proportion as the stirring process advances. The operation should be carried out at a temperature of 100 degrees C. or so.

The duration of boiling varies from 15 to 20 minutes; it can be seen that it is completed when the shine of tar has disappeared and when the matter appears as a dull black sandy mass which is slightly sticky.

It is thereupon transferred into a vessel heated so as to maintain the proper temperature from which it is mechanically delivered into the press molds wherein it should not be beaten down except lightly in the angles.

The molds are very deep and have adjustable punches so as to obtain all the desired thicknesses; reduction through pressure should reach a minimum of 40%. The pressure to be exercised per square centimeter of surface is adjusted according to the ultimate use to be made of the material. A suitable pressure would be 200 to 250 atmospheres, and 70° to 80° C. a suitable temperature. The molds as well as the plugging plates are previously coated in the usual manner with a layer of sticky clay diluted in water, this is to avoid adherence to the metal.

The products thus obtained may be in various forms suitable for the most varied uses: sundry constructions, for roofing buildings, terraces, paving purposes generally, sound-proof and vibration-proof walls, damp-proof and sanitary purposes, and the like.

Materials intended for paving purposes are made in the form of bricks or blocks; the same can be placed in position in various ways, either on a cement concrete bed (for bricks) or simply on sand (for blocks).

(1) In order to obtain a smooth, continuous and monolithic facing in which case the bricks are jointed together and upon the concrete by means of boiling mastic to which cement has been added.

(2) In order to obtain paving similar to wood paving in which case the bricks are laid according to a chosen design, being fixed on the concrete by means of a layer of cement mortar and by filling the joints with cement paste.

(3) In order to obtain paving similar to cubic stone paving in which case the blocks are arranged on a layer of sand and jointed together by means of a socket arrangement filled in with mastic as for process No. 1.

(4) In order to obtain paving for tramway track in any of the three manners as aforesaid, in which case the bricks or blocks are molded according to a section corresponding exactly to that of the rail and are jointed to the latter by means of boiling mastic to which cement has been added in order to form an adhesive and elastic joint capable of bearing without ill effects the vibration and dilatations of the metal.

The various possible special uses call for slight alterations in the proportion of raw materials employed but in any case the useful proportions are those the respective averages of which have been stated in the aforesaid formulæ and they only vary in a limited measure.

What I claim and desire to secure by Letters Patent in the United States is:—

1. The herein described process of producing a water-proof building material, which consists in adding india rubber dissolved in a mixture of benzol and carbon bisulfid to gas tar heated to a high temperature, and thereafter adding cement to the product.

2. The herein described process of producing a water-proof building material, which consists in adding india rubber dissolved in a mixture of benzol and carbon bisulfid to gas tar heated to a high temperature, adding inert matter to the dissolved india rubber, and finally adding cement to the mixture of india rubber and inert matter.

3. The herein described process of producing a water-proof building material, which consists in dissolving india rubber in a mixture of benzol and carbon bisulfid, allowing said solution to cool, adding thereto gas tar distillate from which benzol has been removed, liquefying said mixture by heat and adding cement thereto, and finally subjecting the product to pressure.

4. The herein described process of producing a water-proof building material, which consists in dissolving india rubber in a mixture of benzol and carbon bisulfid, allowing said solution to cool, adding thereto gas tar distillate at a density of approximately 1.220 and temperature of approximately 55° C. from which distillate the benzol has been removed, liquefying said mixture by heat and adding cement thereto, and finally subjecting the product to pressure.

5. The herein described process of producing a water-proof building material, which consists in dissolving india-rubber in a mixture of benzol and carbon bisulfid, allowing said solution to cool adding thereto gas tar distillate from which benzol has been removed, liquefying said mixture by heat and adding inert matter and cement thereto, and finally subjecting the product to pressure.

In testimony whereof I have hereunto set my hand in the presence of a witness.

ALFRED CARLES DE CAUDEMBERG.

Witness:
HIPPOLYTE DUVAL.